US012347600B2

(12) United States Patent
Yasuda et al.

(10) Patent No.: US 12,347,600 B2
(45) Date of Patent: Jul. 1, 2025

(54) INDUCTOR COMPONENT AND METHOD OF MANUFACTURING INDUCTOR COMPONENT

(71) Applicant: Murata Manufacturing Co., Ltd., Kyoto-fu (JP)

(72) Inventors: Shinji Yasuda, Nagaokakyo (JP); Yoshinori Taguchi, Nagaokakyo (JP); Yoshimasa Yoshioka, Nagaokakyo (JP); Akinori Hamada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 555 days.

(21) Appl. No.: 16/544,304

(22) Filed: Aug. 19, 2019

(65) Prior Publication Data

US 2020/0105457 A1 Apr. 2, 2020

(30) Foreign Application Priority Data

Sep. 28, 2018 (JP) ................................ 2018-184099

(51) Int. Cl.
*H01F 27/28* (2006.01)
*H01F 27/29* (2006.01)
(Continued)

(52) U.S. Cl.
CPC ......... *H01F 27/2804* (2013.01); *H01F 27/29* (2013.01); *H01F 27/34* (2013.01); *H01F 41/041* (2013.01); *H01F 2027/2809* (2013.01)

(58) Field of Classification Search
CPC ......... H01F 27/2804; H01F 2027/2809; H01F 17/0013; H01F 17/0006; H01F 5/003; H01F 27/29; H01F 27/292; H01F 27/34
(Continued)

(56) References Cited

U.S. PATENT DOCUMENTS 5,515,022 A * 5/1996 Tashiro ............... H01F 17/0013 336/200
2009/0139759 A1* 6/2009 Ueda ...................... H05K 1/116 156/60

(Continued)

FOREIGN PATENT DOCUMENTS

CN 107818864 A 3/2018
JP 05036533 A * 2/1993

(Continued)

OTHER PUBLICATIONS

An Office Action; "Notice of Reasons for Refusal," mailed by the Japanese Patent Office on Feb. 16, 2021, which corresponds to Japanese Patent Application No. 2018-184099 and is related to U.S. Appl. No. 16/544,304; with English language translation.

*Primary Examiner* — Tszfung J Chan
(74) *Attorney, Agent, or Firm* — Studebaker Brackett PLLC

(57) ABSTRACT

An inductor component comprising an element body including a first and second magnetic layers that contain a metal magnetic powder and that are laminated along a first direction, a spiral wiring disposed between the first and second magnetic layers, a vertical wiring connected to the spiral wiring and extending in the first direction to penetrate the element body and an external terminal connected to the vertical wiring and exposed on a first principal surface of the element body orthogonal to the first direction. The spiral wiring is disposed on a first plane orthogonal to the first direction and includes a pad part to which the vertical wiring is connected, a spiral part extending from the pad part on the first plane, and a lead-out part extending from the pad part on the first plane and exposed from a side surface of the element body parallel to the first direction.

21 Claims, 6 Drawing Sheets

(51) Int. Cl.
*H01F 27/34* (2006.01)
*H01F 41/04* (2006.01)

(58) Field of Classification Search
USPC .................................................. 336/200, 232
See application file for complete search history.

(56) References Cited

U.S. PATENT DOCUMENTS

| | | | | |
|---|---|---|---|---|
| 2011/0193671 | A1* | 8/2011 | Iwasaki | H01F 17/0033 336/200 |
| 2012/0062348 | A1* | 3/2012 | Hashimoto | H01F 27/292 336/192 |
| 2012/0133472 | A1* | 5/2012 | Nishikawa | H01F 17/04 336/200 |
| 2014/0009254 | A1* | 1/2014 | Ohkubo | H01F 17/0033 336/192 |
| 2015/0035634 | A1* | 2/2015 | Nakamura | H01F 41/046 336/170 |
| 2017/0169930 | A1* | 6/2017 | Kudo | H01F 17/0013 |
| 2018/0075965 | A1* | 3/2018 | Yoshioka | H01F 27/2823 |
| 2018/0166199 | A1* | 6/2018 | Hachiya | H01F 27/292 |
| 2018/0308617 | A1* | 10/2018 | Ha | H01F 17/0013 |
| 2019/0074125 | A1* | 3/2019 | Yoshioka | H01F 27/292 |
| 2019/0115150 | A1* | 4/2019 | Yoshioka | H01F 41/046 |
| 2019/0122800 | A1* | 4/2019 | Oshima | H01F 27/292 |
| 2019/0244743 | A1* | 8/2019 | Hirai | H01F 41/12 |
| 2019/0304663 | A1* | 10/2019 | Shimoichi | H01F 17/0013 |
| 2020/0027645 | A1* | 1/2020 | Yoshioka | H01F 27/323 |
| 2020/0027646 | A1* | 1/2020 | Hamada | H01F 27/323 |

FOREIGN PATENT DOCUMENTS

| | | | | | |
|---|---|---|---|---|---|
| JP | 2000133521 | A | * | 5/2000 | |
| JP | 2000150241 | A | * | 5/2000 | |
| JP | 2005191191 | A | * | 7/2005 | |
| JP | 2007066973 | A | * | 3/2007 | |
| JP | 2009049335 | A | * | 3/2009 | H01F 17/0006 |
| JP | 2010040701 | A | * | 2/2010 | |
| JP | 2013-225718 | A | | 10/2013 | |
| JP | 2014-013815 | A | | 1/2014 | |
| JP | 2015191191 | A | * | 11/2015 | |
| JP | 2018-046051 | A | | 3/2018 | |
| KR | 2015009391 | A | * | 1/2015 | H01F 17/0013 |

* cited by examiner

INDUCTOR COMPONENT AND METHOD OF MANUFACTURING INDUCTOR COMPONENT

CROSS REFERENCE TO RELATED APPLICATION

This application claims benefit of priority to Japanese Patent Application 2018-184099 filed Sep. 28, 2018, the entire content of which is incorporated herein by reference.

BACKGROUND

Technical Field

The present disclosure relates to an inductor component and a method of manufacturing an inductor component.

Background Art

A conventional inductor component is described in Japanese Laid-Open Patent Publication No. 2013-225718. This inductor component includes an insulating substrate, a spiral conductor formed on a principal surface of the insulating substrate, an insulating resin layer covering the spiral conductor, an upper core and a lower core covering the upper-surface side and the back-surface side of the insulating substrate, and a pair of terminal electrodes. The upper core and the lower core are made of metal magnetic powder-containing resin.

SUMMARY

If it is attempted to increase a magnetic permeability of a magnetic material of an upper core and a lower core so as to enhance an inductance acquisition efficiency in a conventional inductor component as described above, a content of metal magnetic powder is increased. In this case, the insulation of the upper core and the lower core is reduced, and various problems may occur.

Particularly, in the manufacturing process of the inductor component, from the viewpoint of manufacturing efficiency, a large number of inductor components are manufactured by singulation from a mother substrate in which a plurality of inductor components are formed in a matrix shape on the same plane. In this process, if static electricity generated by a manufacturing facility or a manufacturing operator is applied to a portion of inductor components in the mother substrate, a potential difference is generated between adjacent inductor components, and dielectric breakdown may occur in the upper core or the lower core reduced in insulation. Therefore, a problem of reduced manufacturability occurs due to construction of a dedicated line in which countermeasures against static electricity are taken so as to enhance an inductance acquisition efficiency.

Therefore, the present disclosure is to provide an inductor component and a method of manufacturing an inductor component capable of suppressing a reduction in manufacturability for enhancing an inductance acquisition efficiency.

Accordingly, an aspect of the present disclosure provides an inductor component comprising an element body including a first magnetic layer and a second magnetic layer that contain a metal magnetic powder and that are laminated along a first direction; a spiral wiring disposed between the first magnetic layer and the second magnetic layer a vertical wiring connected to the spiral wiring and extending in the first direction to penetrate the element body; and an external terminal connected to the vertical wiring and exposed on a first principal surface of the element body orthogonal to the first direction. The spiral wiring is disposed on a first plane orthogonal to the first direction and includes a pad part to which the vertical wiring is connected, a spiral part extending from the pad part on the first plane, and a lead-out part extending from the pad part on the first plane and exposed from a side surface of the element body parallel to the first direction.

In this description, the spiral wiring (spiral part) means a curve (two-dimensional curve) extending on a plane, may be a curve having the number of turns exceeding one or may be a curve having the number of turns less than one, or may have a portion that is a straight line.

According to the aspect, even in the case that the insulation of the first magnetic layer and the second magnetic layer is reduced by increasing the content of the metal magnetic powder of the first magnetic layer and the second magnetic layer, a discharge path for static electricity can be ensured with the lead-out part exposed from the side surface of the element body. For example, by connecting the lead-out part to a ground line in a manufacturing process, static electricity flows out to the ground line even if static electricity is applied to the inductor component, so that occurrence of dielectric breakdown can be reduced. Additionally, by connecting respective spiral wirings of multiple inductor components through lead-out parts in a mother substrate, generation of a potential difference can be suppressed between the adjacent inductor components even if static electricity is applied to a portion of the inductor components, so that occurrence of dielectric breakdown can be reduced. Therefore, it is not necessary to construct a dedicated line etc. in which countermeasures against static electricity are taken so as to enhance the inductance acquisition efficiency, and the inductor component capable of suppressing a reduction in manufacturability can be provided.

In an embodiment of the inductor component, the lead-out part extends from the pad part in a direction without turning back toward the spiral part. In this description, the phrase "the lead-out part extends from the pad part in a direction without turning back toward the spiral part" refers to the case that the angles formed by the direction of extension of the lead-out part from the pad part and the direction of extension of the spiral part from the pad part include an angle of 90° or more and 180° or less (i.e., from 90° to 180°) as the angle that is not larger. According to the embodiment, since the influence of the lead-out part blocking a magnetic flux generated by the spiral part can be reduced, the deterioration in inductance acquisition efficiency due to the lead-out part can be suppressed.

In an embodiment of the inductor component, the lead-out part extends from the pad part in a direction opposite to the center side of the spiral part. According to the embodiment, the deterioration in inductance acquisition efficiency due to the lead-out part can further be suppressed.

In an embodiment of the inductor component, the lead-out part is exposed from the side surface of the element body closest to the pad part. According to the embodiment, the deterioration in inductance acquisition efficiency due to the lead-out part can further be suppressed.

In an embodiment of the inductor component, the width of the pad part is larger than the width of the spiral part and larger than the width of the lead-out part. According to the embodiment, the spiral part and the lead-out part can be reliably connected to the pad part. Moreover, the cutting resistance at the time of singulation can be reduced, and the ratio of the first magnetic layer and the second magnetic layer in the inductor component can be increased. Further, the vertical wiring connected to the pad part can be reliably connected to the spiral wiring. The term "width" refers to a dimension generally orthogonal to a current in a planar direction and is a dimension in the direction orthogonal to the extending direction on the first plane in the case of the spiral part and the lead-out part and is the smallest of the dimensions parallel to the first plane in the case of the pad part.

In an embodiment of the inductor component, the inductor component further comprises an insulating layer coating a surface of the spiral wiring and containing no magnetic substance, and the vertical wiring includes a columnar wiring penetrating the first magnetic layer or the second magnetic layer of the element body and a via wiring penetrating the insulating layer. According to the embodiment, the insulation of the spiral wiring can be improved.

In an embodiment of the inductor component, the lead-out part includes an oxide film exposed from the side surface of the element body. According to the embodiment, a discharge via an exposed surface of the lead-out part can be suppressed in the inductor component after singulation.

In an embodiment of the inductor component, the oxide film is a metal oxide film. According to the embodiment, the oxide film can easily be formed, and the processing cost can be reduced.

In an embodiment of the inductor component, the width of the lead-out part is equal to or less than the width of the spiral part and equal to or greater than 50 μm. According to the embodiment, while the proportions of the first magnetic layer and the second magnetic layer are increased in the inductor component, a failure due to disconnection can be prevented in the lead-out part.

In an embodiment of the inductor component, the thickness of the lead-out part is equal to the thickness of the spiral part. According to the embodiment, the spiral wiring can be formed relatively flat, and the lamination stability of the first magnetic layer and the second magnetic layer can be improved in the element body.

In an embodiment of the inductor component, an area of an exposed surface of the lead-out part exposed from the side surface of the element body is larger than a cross-sectional area of a portion of the lead-out part located inside the element body. According to the embodiment, a path for discharge from the side surface can more easily be ensured.

In an embodiment of the inductor component, the inductor component further comprises a second spiral wiring disposed between the first magnetic layer and the second magnetic layer, and another vertical wiring connected to the second spiral wiring and extending in the first direction to penetrate the element body. The second spiral wiring is disposed on the first plane and includes another pad part to which the other vertical wiring is connected, another spiral part extending from the other pad part on the first plane, and another lead-out part extending from the other pad part on the first plane and exposed from a side surface of the element body parallel to the first direction. According to the embodiment, a plurality of spiral wirings can be formed in the inductor component without reducing the manufacturability.

In an embodiment of the inductor component, the side surface exposing the second spiral wiring is orthogonal to the side surface exposing the spiral wiring. According to the embodiment, a potential difference is less likely to occur between the inductor components formed in a matrix shape in the mother substrate.

In an embodiment of a method of manufacturing an inductor component, the method comprises the steps of forming a plurality of spiral wirings on a first plane; sealing the plurality of spiral wirings with a first magnetic layer and a second magnetic layer from both sides in a first direction orthogonal to the first plane; and singulating the plurality of the sealed spiral wirings for each of the spiral wirings. At the step of forming the plurality of spiral wirings, the plurality of spiral wirings is electrically connected via lead-out parts to have the same potential as each other.

The same potential refers to not only a state in which strictly no potential difference exists, but also the same potential between two points of wirings with consideration given to a voltage reduction corresponding to a path length due to an electric resistance component of the wirings.

According to the embodiment, since the plurality of spiral wirings has the same potential as each other in the mother substrate state before singulation, the occurrence of dielectric breakdown due to static electricity can be reduced. Therefore, it is not necessary to construct a dedicated line etc. in which countermeasures against static electricity are taken so as to enhance the inductance acquisition efficiency, and the inductor component capable of suppressing a reduction in manufacturability can be provided.

According to the inductor component and the method of manufacturing the inductor component according to an aspect of the present disclosure, a reduction in manufacturability for enhancing an inductance acquisition efficiency can be suppressed.

DETAILED DESCRIPTION

An inductor component of an aspect of the present disclosure will now be described in detail with reference to shown embodiments. The drawings include schematics and may not reflect actual dimensions or ratios.

First Embodiment (Configuration)

Figure 1A:
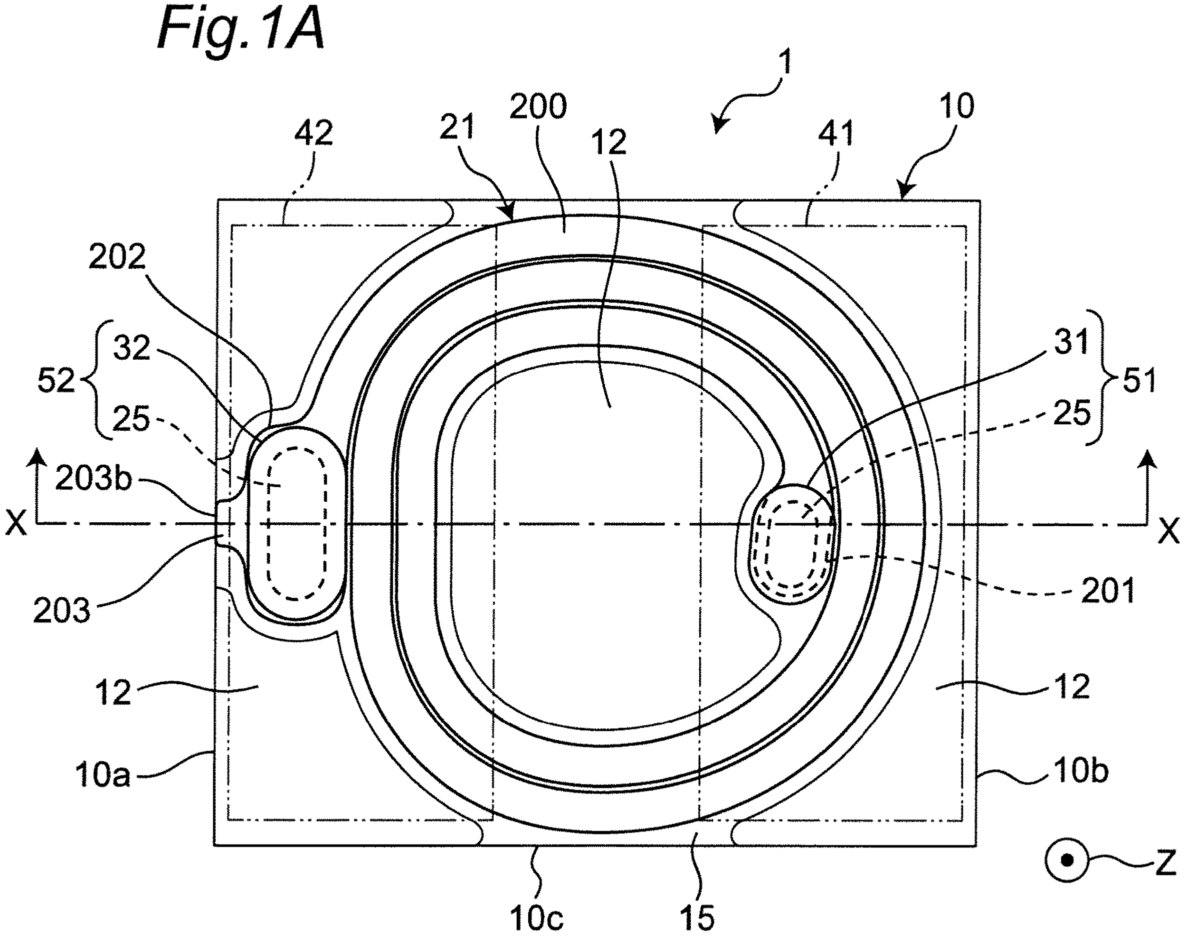
FIG. 1A a transparent plan view showing an inductor component according to a first embodiment.
Figure 1B:
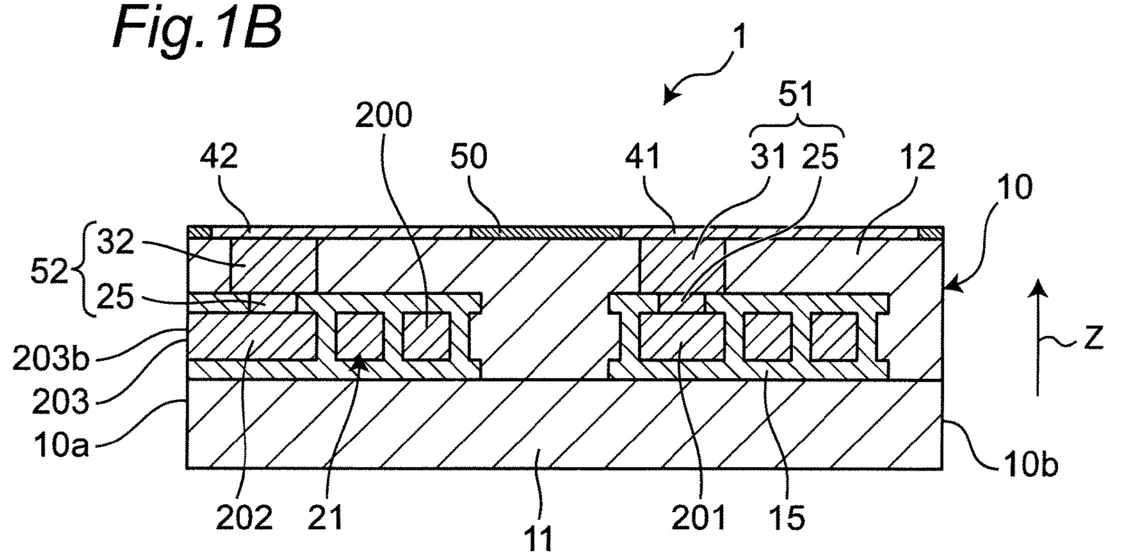
FIG. 1B is a cross-sectional view showing the inductor component according to the first embodiment.

FIG. 1A is a transparent plan view showing a first embodiment of an inductor component. FIG. 1B is a cross-sectional view taken along a line X-X of FIG. 1A.

An inductor component 1 is mounted on an electronic device such as a personal computer, a DVD player, a digital camera, a TV, a portable telephone, and automotive electronics, for example, and is a component generally having a rectangular parallelepiped shape, for example. However, the shape of the inductor component 1 is not particularly limited and may be a circular columnar shape, a polygonal columnar shape, a truncated cone shape, or a truncated polygonal pyramid shape.

As shown in FIGS. 1A and 1B, the inductor component 1 includes an element body 10, an insulating layer 15, a spiral wiring 21, vertical wirings 51, 52, external terminals 41, 42, and a coating film 50.

The element body 10 has a first magnetic layer 11 and a second magnetic layer 12 disposed on the first magnetic layer 11. The first magnetic layer 11 and the second magnetic layer 12 are laminated along a first direction Z. The element body 10 has a two-layer structure of the first magnetic layer 11 and the second magnetic layer 12; however, the element body 10 may have a three-layer structure with a substrate disposed between the first magnetic layer 11 and the second magnetic layer 12. In the following description, as shown in the figures, it is assumed that a forward direction (upward in FIG. 1B) and a reverse direction (downward in FIG. 1B) of the first direction Z face upward and downward, respectively. The element body 10 includes a first side surface 10*a*, a second side surface 10*b*, and a third side surface 10*c* parallel to the first direction Z. The first side surface 10*a* and the second side surface 10*b* are located on the sides opposite to each other, and the third side surface 10*c* is located between the first side surface 10*a* and the second side surface 10*b*.

The first magnetic layer 11 and the second magnetic layer 12 are made of a resin containing a metal magnetic powder. Therefore, as compared to a magnetic layer made of ferrite, the metal magnetic powder can improve the DC superimposition characteristics, and the resin insulates particles of the metal magnetic powder, so that a loss (iron loss) at high frequency is reduced.

The resin includes any of epoxy, polyimide, phenol, and vinyl ether resins, for example. This improves the insulation reliability. More specifically, the resin is epoxy, or a mixture of epoxy and acrylic, or a mixture of epoxy, acrylic, and another resin. As a result, the insulation among particles of the metal magnetic powder is ensured, so that a loss (iron loss) at high frequency can be made smaller.

The metal magnetic powder has an average particle diameter of 0.1 μm or more and 5 μm or less (i.e., from 0.1 μm to 5 μm), for example. In a manufacturing stage of the inductor component 1, the average particle diameter of the metal magnetic powder can be calculated as a particle diameter corresponding to 50% of an integrated value in particle size distribution obtained by a laser diffraction/scattering method. The metal magnetic powder is made of, for example, an FeSi alloy such as FeSiCr, an FeCo alloy, an Fe alloy such as NiFe, or an amorphous alloy thereof. The content percentage of the metal magnetic powder is, preferably, 20 vol % or more and 70 vol % or less (i.e., from 20 vol % to 70 vol %) relative to the whole magnetic layer. When the average particle diameter of the metal magnetic powder is 5 μm or less, the DC superimposition characteristics are further improved, and the iron loss at high frequency can be reduced by fine powder. When the average particle diameter of the metal magnetic powder is 0.1 μm or more, uniform dispersion in the resin is facilitated, and the manufacturing efficiency of the first magnetic layer 11 and the second magnetic layer 12 is improved. instead of or in addition to the metal magnetic powder, magnetic powder of NiZn- or MnZn-based ferrite may be used.

The spiral wiring 21 is formed only on the upper side of the first magnetic layer 11, or specifically, on the insulating layer 15 disposed on an upper surface of the first magnetic layer 11 and is a wiring extending in a spiral shape along the upper surface of the first magnetic layer 11. The spiral wiring 21 has a spiral shape with the number of turns exceeding one. The spiral wiring 21 is spirally wound in a clockwise direction from an outer circumferential end toward an inner circumferential end when viewed from the upper side, for example.

The thickness of the spiral wiring 21 is preferably 40 μm or more and 120 μm or less (i.e., from 40 μm to 120 μm), for example. An example of the spiral wiring 21 has a thickness of 45 μm, a wiring width of 50 μm, and an inter-wiring space of 10 μm. The inter-wiring space is preferably 3 μm or more and 20 μm or less (i.e., from 3 μm to 20 μm).

The spiral wiring 21 is made of a conductive material and is made of a metal material having a low electric resistance such as Cu, Ag, Au, Fe, or an alloy containing them, for example. Therefore, the direct current resistance of the inductor component 1 can be reduced. In this embodiment, the inductor component 1 includes only one layer of the spiral wiring 21, so that the inductor component 1 can be reduced in height as compared to a configuration in which a plurality of spiral wirings is laminated.

The spiral wiring 21 is disposed on a first plane orthogonal to the first direction Z (along the upper surface of the first magnetic layer 11). The spiral wiring 21 has a spiral part 200, a first pad part 201, a second pad part 202, and a lead-out part 203. The first pad part 201 is connected to a first vertical wiring 51, and the second pad part 202 is connected to a second vertical wiring 52. The spiral part 200 has an inner circumferential end at the first pad part 201 and an outer circumferential end at the second pad part 202 and is extended and spirally wound from the first pad part 201 and the second pad part 202 on the first plane. The lead-out part 203 extends from the second pad part 202 on the first plane and is exposed from the first side surface 10*a* parallel to the first direction Z of the element body 10.

The insulating layer 15 is a film-shaped layer formed on the upper surface of the first magnetic layer 11 and coats the surface of the spiral wiring 21. The spiral wiring 21 has the surface coated with the insulating layer 15 and therefore can improve insulation reliability. Specifically, the insulating layer 15 entirely covers the bottom and side surfaces of the spiral wiring 21 and covers a portion of the upper surface of the spiral wiring 21 except the pad parts 201, 202 that are connection portions with via wirings 25. The insulating layer 15 has holes at positions corresponding to the pad parts 201, 202 of the spiral wiring 21. The holes can be formed by opening holes by a laser, for example. The thickness of the insulating layer 15 between the first magnetic layer 11 and the bottom surface of the spiral wiring 21 is 10 μm or less, for example.

The insulating layer 15 is made of an insulating material containing no magnetic substance and is made of, for example, a resin material such as an epoxy resin, a phenol resin, a polyimide resin. The insulating layer 15 may contain a filler of a nonmagnetic substance such as silica and, in this case, the insulating layer 15 can be improved in the strength, workability, and electrical characteristics.

The vertical wirings 51, 52 are made of the same conductive material as the spiral wiring 21, extend from the spiral wiring 21 in the first direction Z, and penetrate the element body 10.

The first vertical wiring 51 includes the via conductor 25 extending upward from the upper surface of the first pad part 201 of the spiral wiring 21 and penetrating the inside of the insulating layer 15, and a first columnar wiring 31 extending upward from the via conductor 25 and penetrating the inside of the second magnetic layer 12. The second vertical wiring 52 includes the via conductor 25 extending upward from the upper surface of the second pad part 202 of the spiral wiring 21 and penetrating the insulating layer 15, and a second columnar wiring 32 extending upward from the via conductor 25 and penetrating the inside of the second magnetic layer 12.

The external terminals 41, 42 are made of a conductive material and has, for example, a three-layer configuration of metal layers made of Cu having low electric resistance and excellent in stress resistance, Ni excellent in corrosion resistance, and Au excellent in solder wettability and reliability arranged in this order from the inside to the outside.

The first external terminal 41 is disposed on an upper surface of the second magnetic layer 12 and covers an end surface of the first columnar wiring 31 exposed from the upper surface. As a result, the first external terminal 41 is electrically connected to the first pad part 201 of the spiral wiring 21. The second external terminal 42 is disposed on the upper surface of the second magnetic layer 12 and covers an end surface of the second columnar wiring 32 exposed from the upper surface. As a result, the second external terminal 42 is electrically connected to the second pad part 202 of the spiral wiring 21.

Preferably, a rust prevention treatment is applied to the external terminals 41, 42. This rust prevention treatment refers to forming a metal layer of Ni and a metal layer of Au, or a metal layer of Ni and a metal layer of Sn, as a film on the surfaces of the external terminals 41, 42. This enables the suppression of copper leaching due to solder and the rusting so that the inductor component 1 with high mounting reliability can be provided.

The coating film 50 is made of, for example, an insulating material exemplified as the material of the insulating layer 15 and covers the upper surface of the second magnetic layer 12 to expose the end surfaces of the columnar wirings 31, 32 and the external terminals 41, 42. With the coating film 50, the insulation of the surface of the inductor component 1 can be ensured. The coating film 50 may be formed on the lower surface side of the first magnetic layer 11.

Figure 2:
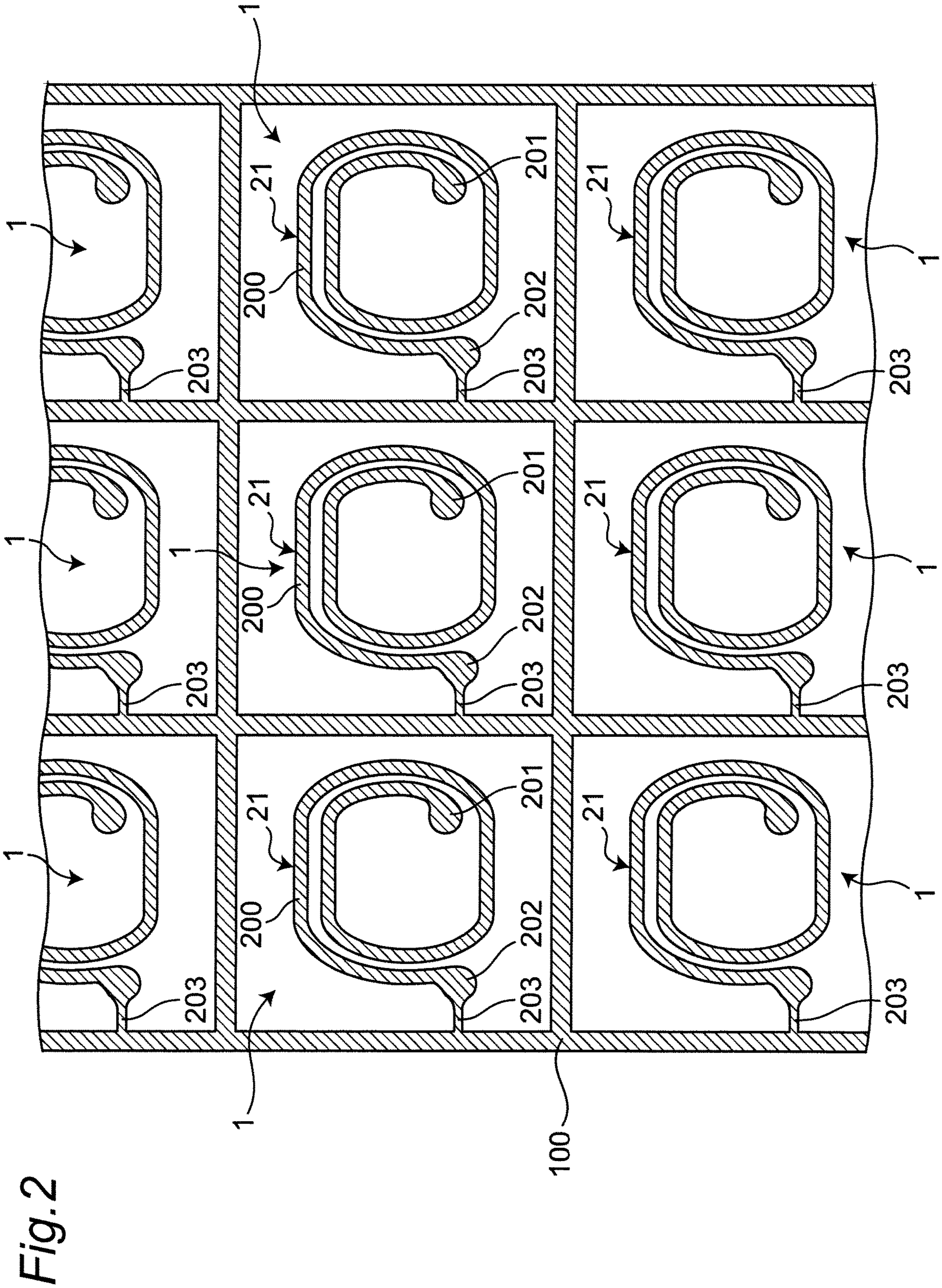
FIG. 2 is a simplification view showing a plurality of inductor components in a mother substrate state.

According to the inductor component 1 having the configuration described above, if it is attempted to increase the magnetic permeability of the magnetic material of the first magnetic layer 11 and the second magnetic layer 12 so as to enhance the inductance acquisition efficiency, the content of the metal magnetic powder is increased. Even in the case that this reduces the insulation of the first magnetic layer 11 and the second magnetic layer 12, the inductor component 1 can ensure a discharge path for static electricity with the lead-out part 203 exposed from the first side surface 10*a* of the element body 10. For example, by connecting the lead-out part 203 to a ground line in a manufacturing process, static electricity flows out to the ground line even if static electricity is applied to the inductor component 1, so that the occurrence of dielectric breakdown of the inductor component 1 can be reduced. Additionally, by connecting the respective spiral wirings 21 of the multiple inductor components 1 (so-called multiple chips) through the lead-out parts 203 in the mother substrate as shown in FIG. 2, generation of a potential difference can be suppressed between the adjacent inductor components 1 even if static electricity is applied to a portion of the inductor components 1, so that the occurrence of the dielectric breakdown can be reduced. Therefore, it is not necessary to construct a dedicated line etc. in which countermeasures against static electricity are taken so as to enhance the inductance acquisition efficiency, and the inductor component 1 capable of suppressing a reduction in manufacturability can be provided. In FIG. 2, only the spiral wirings 21 of the inductor components 1 are indicated by hatching for facilitating understanding. As shown in FIG. 2, the multiple spiral wirings 21 are connected via a connecting part 100, and more specifically, the lead-out parts 203 of the spiral wirings 21 are connected to the connecting part 100 to integrally connect the multiple spiral wirings 21. As described later, the multiple inductor components 1 are separated into individual chips at the lead-out parts 203.

In the inductor component 1 having the configuration described above, the lead-out part 203 is preferably formed outside the spiral part 200, and in this case, deterioration in the inductance acquisition efficiency can be reduced. This configuration will hereinafter be described.

Figure 3:
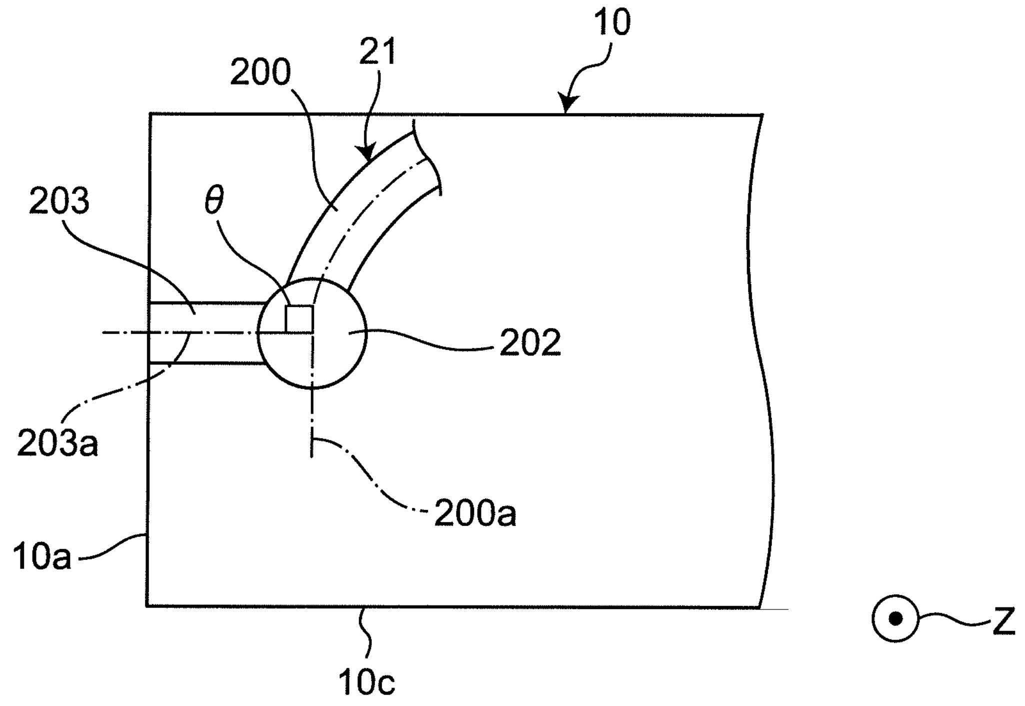
FIG. 3 is a simplification view showing a positional relationship between a spiral part and a lead-out part.

As shown in FIG. 1A, the lead-out part 203 preferably extends from the second pad part 202 in a direction without turning back toward the spiral part 200. Specifically, as shown in FIG. 3, an angle θ formed by the lead-out part 203 and the spiral part 200 is defined as an angle that is not larger between the angles formed by an extending direction 203*a* of a center line of the lead-out part 203 and an extending direction 200*a* of a center line of the spiral part 200. As described above, the lead-out part 203 extending from the second pad part 202 in a direction without turning back toward the spiral part 200 means that the angle θ is 90° or more and 180° or less (i.e., from 90° to 180°). In this embodiment, the angle θ is 90°. As a result, the lead-out part 203 is not at a position facing the spiral part 200, so that the influence of the lead-out part 203 blocking a magnetic flux generated by the spiral part 200 can be reduced, and therefore, the deterioration in the inductance acquisition efficiency due to the lead-out part 203 can be suppressed.

The lead-out part 203 is Preferably exposed from the first side surface 10*a* of the element body 10 closest to the second pad part 202. As a result, the deterioration in the inductance acquisition efficiency due to the lead-out part 203 can further be suppressed.

The width of the second pad part 202 is preferably larger than the width of the spiral part 200 and larger than the width of the lead-out part 203. The width of the second pad part 202 corresponds to the diameter when the shape of the second pad part 202 is circular and corresponds to the minor axis when the shape of the second pad part 202 is elliptical. As a result, the spiral part 200 and the lead-out part 203 can reliably be connected to the second pad part 202. Additionally, a cutting resistance can be reduced at the time of singulation, and proportions of the first magnetic layer 11 and the second magnetic layer 12 can be increased in the inductor component 1. The second vertical wiring 52 connected to the second pad part 202 can reliably be connected to the spiral wiring 21.

The lead-out part 203 preferably has an oxide film exposed from the first side surface 10*a* of the element body 10. As a result, a discharge via an exposed surface 203*b* of the lead-out part 203 can be suppressed in the inductor component 1 after singulation. The oxide film is preferably a metal oxide film, and in this case, the oxide film can easily be formed, and the processing cost can be reduced. Specifically, if the lead-out part 203 is made of Cu, the exposed surface 203*b* is preferably an oxide film of $CuO_2$, i.e., an oxide film of the main component of the lead-out part 203. The exposed surface 203*b* may be an oxide film of a substance that is not the main component of the lead-out part 203, for example, an oxide film of $SiO_2$ etc.

The width of the lead-out part 203 is preferably equal to or less than the width of the spiral part 200 and equal to or greater than 50 μm. As a result, while the proportions of the first magnetic layer 11 and the second magnetic layer 12 are increased in the inductor component 1, a failure due to disconnection can be prevented in the lead-out part 203.

The thickness of the lead-out part 203 is preferably equal to the thickness of the spiral part 200. As a result, the spiral wiring 21 can be formed relatively flat, and the lamination stability of the first magnetic layer 11 and the second magnetic layer 12 can be improved in the element body 10.

Figure 4:
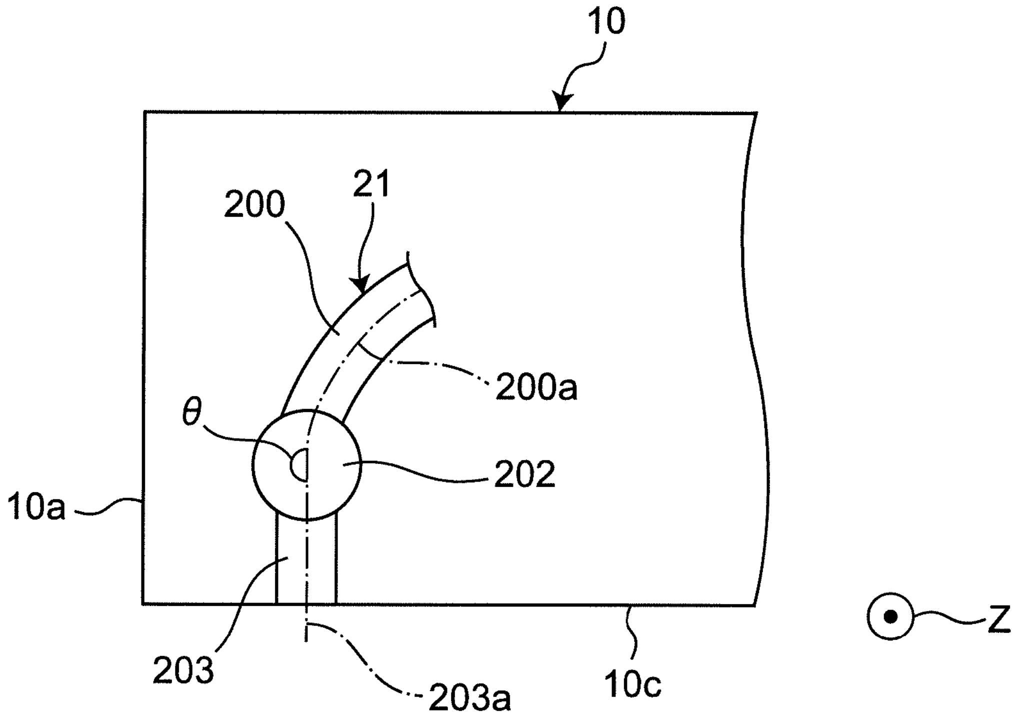
FIG. 4 is a simplification view showing another positional relationship between the spiral part and the lead-out part.

In another example of the lead-out part 203 extending from the second pad part 202 in a direction without turning back toward the spiral part 200, for example, as shown in FIG. 4, the angle θ formed by the lead-out part 203 (the extending direction 203*a*) and the spiral part 200 (the extending direction 200*a*) is 180°.

In the case that the lead-out part 203 extends from the second pad part 202 in a direction without turning back toward the spiral part 200, as shown in FIGS. 3 and 4, the lead-out part 203 preferably extends from the pad part 202 in the direction opposite to the center side of the spiral part 200. Specifically, for example, in FIGS. 3 and 4, even in the case that the lead-out part 203 extends from the second pad part 202 to the right side or the lower right side of the drawings, the lead-out part 203 extends from the second pad part 202 in a direction without turning back toward the spiral part 200; however, as compared to this case, when the lead-out part 203 extends from the second pad part 202 to the direction opposite to the center side of the spiral part 200 (to the left side or the left right side of the drawings) as described above, the lead-out part 203 is disposed on the lower side of density of magnetic flux generated by the spiral part 200, and therefore, the deterioration in the inductance acquisition efficiency due to the lead-out part 203 can further be suppressed.

The insulating layer 15 covering the spiral wiring 21 may not be included, and in this case, the via wirings 25 are not included as the vertical wirings 51, 52, and only the columnar wirings 31, 32 are included.

Figure 5:
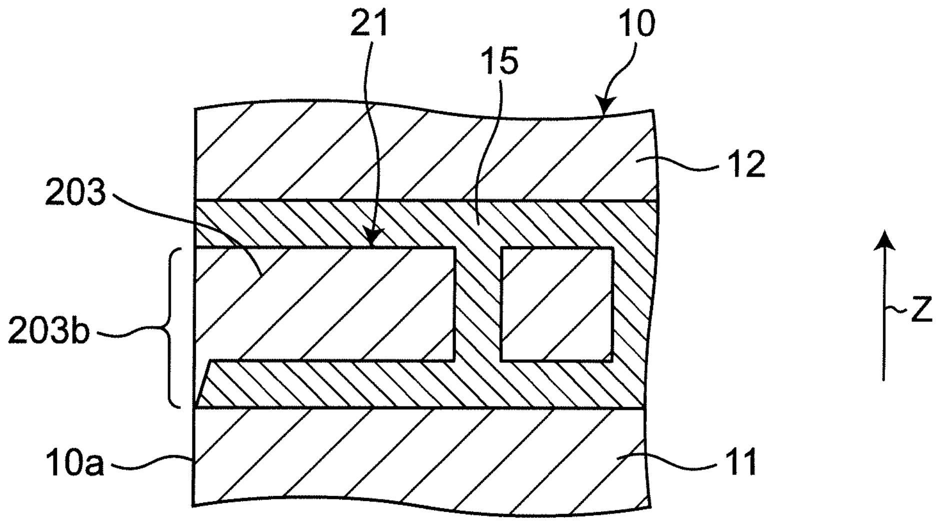
FIG. 5 is a simplification view showing another form of an exposed surface of the spiral part.

As shown in FIG. 5, the area of the exposed surface 203*b* of the lead-out part 203 exposed from the first side surface 10*a* of the element body 10 may be larger than a cross-sectional area of a portion of the lead-out part 203 located inside the element body 10. As a result, a path for discharge from the first side surface 10*a* can more easily be ensured. Additionally, for example, the exposed surface 203*b* of the inductor component 1 after singulation can also more easily be brought into contact with a metal component of a manufacturing facility, so that removal of electricity from the lead-out part 203 can be made easier.

(Manufacturing Method)

A method of manufacturing the inductor component 1 will be described.

The method of manufacturing the inductor component 1 includes a step of forming the multiple spiral wirings 21 on the first plane as shown in FIG. 2. At this step, the spiral wirings 21 are electrically connected via the lead-out parts 203. Specifically, the multiple spiral wirings 21 are formed to be connected to each other via the connecting part 100.

Subsequently, the method of manufacturing the inductor component 1 includes a step of sealing the multiple spiral wirings 21 with the first magnetic layer 11 and the second magnetic layer 12 from both sides (upper and lower sides) in the first direction Z orthogonal to the first plane. Specifically, the multiple spiral wirings 21 connected via the connecting portion 100 and the lead-out part 203 as described above are sandwiched between the first magnetic layer 11 and the second magnetic layer 12 to constitute a mother substrate.

Subsequently, the method of manufacturing the inductor component 1 includes a step of singulating the mother substrate, i.e., the multiple sealed spiral wirings 21, for each of the spiral wirings 21. At the time of singulation, cutting is performed along a cutting line including the connecting part 100 so that the lead-out part 203 of the spiral wiring 21 is exposed.

In the method of manufacturing the inductor component 1, the multiple spiral wirings 21 are electrically connected via the lead-out parts 203 at the step of forming the multiple spiral wirings 21 and therefore have the same potential as each other. As a result, since the multiple spiral wirings have the same potential as each other in the mother substrate state before singulation, the occurrence of dielectric breakdown due to static electricity can be reduced. Therefore, it is not necessary to construct a dedicated line etc. in which countermeasures against static electricity are taken so as to enhance the inductance acquisition efficiency, and the inductor component 1 capable of suppressing a reduction in manufacturability can be provided.

Second Embodiment

Figure 6A:
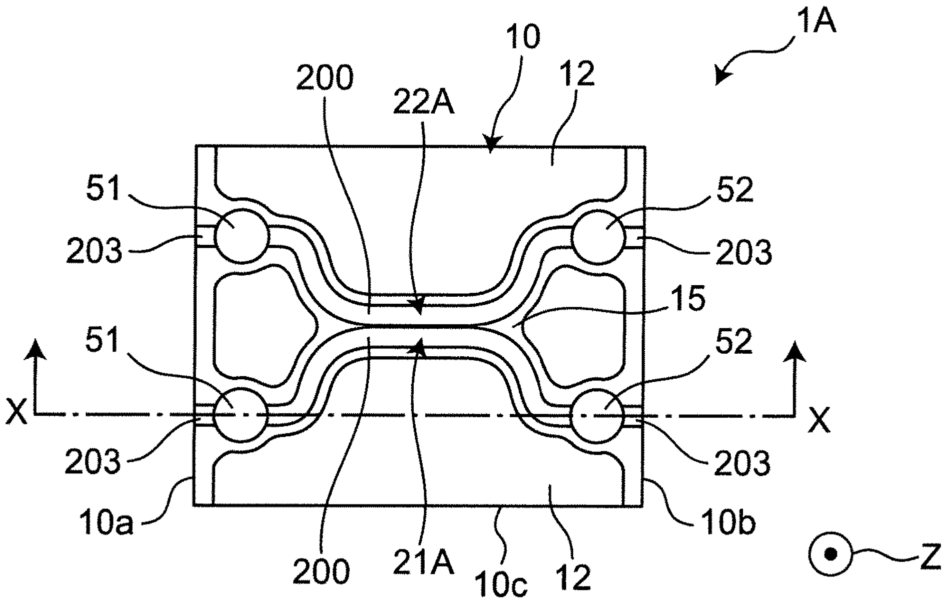
FIG. 6A is a transparent plan view showing an inductor component according to a second embodiment.
Figure 6B:
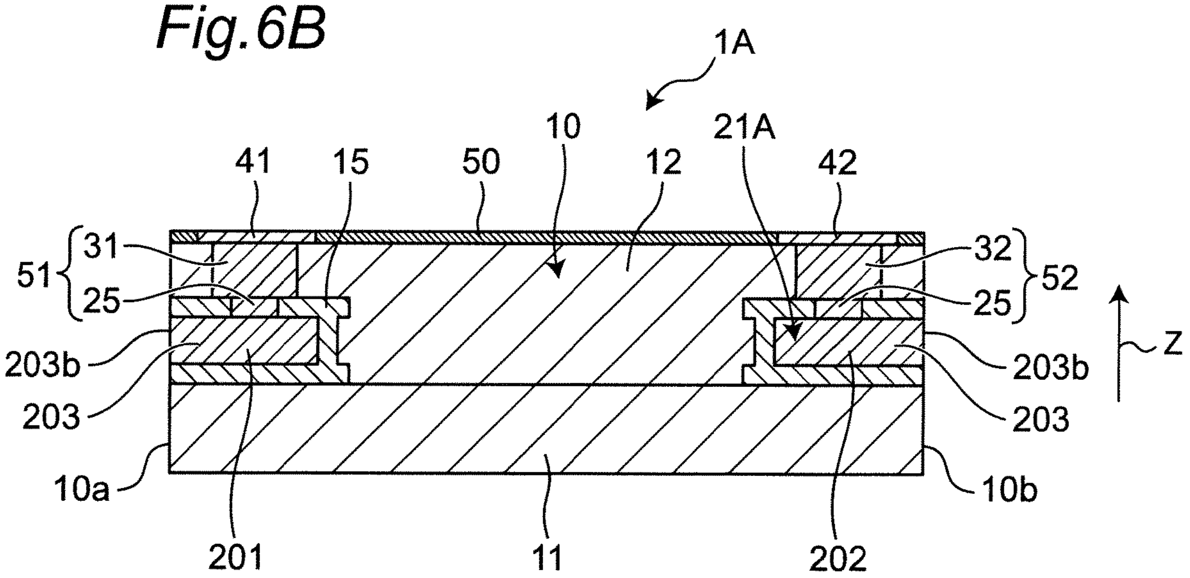
FIG. 6B is cross-sectional view showing the inductor component according to the second embodiment.

FIG. 6A is a transparent plan view showing a second embodiment of the inductor component. FIG. 6B is a cross-sectional view taken along a line X-X of FIG. 6A. The second embodiment is different from the first embodiment in the configuration of the spiral wiring. This different configuration will hereinafter be described. In the second embodiment, the other constituent elements have the same configuration as the first embodiment and therefore will not be described.

As shown in FIGS. 6A and 6B, in an inductor component 1A of the second embodiment, as compared to the inductor component 1 of the first embodiment, a first spiral wiring 21A and a second spiral wiring 22A are disposed between the first magnetic layer 11 and the second magnetic layer 12. Therefore, the first spiral wiring 21A and the second spiral wiring 22A are disposed on the first plane.

The first spiral wiring 21A and the second spiral wiring 22A have a semi-elliptical arc shape when viewed in the first direction Z. Therefore, each of the spiral wirings 21A, 22A is a curved wiring wound around about a half of the circumference. The spiral wirings 21A, 22A each include a linear part in a middle portion.

The spiral wirings 21A, 22A each have both ends connected to the first vertical wiring 51 and the second vertical wiring 52 located on the outer side and have a curved shape drawing an arc from the first vertical wiring 51 and the second vertical wiring 52 toward the center side of the inductor component 1A.

It is assumed that an inner diameter portion of each of the spiral wirings 21A, 22A is defined as an area surrounded by the curve drawn by the spiral wirings 21A, 22A and the straight line connecting both ends of the spiral wirings 21A, 22A. In this case, neither of the spiral wirings 21A, 22A have the inner diameter portions overlapping with each other when viewed in the first direction Z.

On the other hand, the first and second spiral wirings 21A, 22A are close to each other. Therefore, the magnetic flux generated in the first spiral wiring 21A goes around the adjacent second spiral wiring 22A, and the magnetic flux generated in the second spiral wiring 22A goes around the adjacent first spiral wiring 21A. Thus, the magnetic coupling becomes strong between the first spiral wiring 21A and the second spiral wiring 22A.

When currents flow simultaneously through the first and second spiral wirings 21A, 22A from the ends on the same side to the other ends on the opposite side, the magnetic fluxes strengthen each other. This means that when the ends on the same side of the first spiral wiring 21A and the second spiral wiring 22A are both used as the input side of pulse signals and the other ends on the opposite side are both used as the output side of the pulse signals, the first spiral wiring 21A and the second spiral wiring 22A are positively coupled. On the other hand, for example, when one of the first spiral wiring 21A and the second spiral wiring 22A has one end side used for input and the other end side used for output while the other spiral wiring has one end side used for output and the other end side used for input, the first spiral wiring 21A and the second spiral wiring 22A can be brought into a negatively coupled state.

The first vertical wiring 51 connected to the one end sides of the spiral wirings 21A, 22A and the second vertical wiring 52 connected to the other end sides of the spiral wirings 21A, 22A each penetrate the inside of the second magnetic layer 12 and is exposed on the upper surface. The first external terminal 41 is connected to the first vertical wiring 51, and the second external terminal 42 is connected to the second vertical wiring 52.

The first spiral wiring 21A and the second spiral wiring 22A are integrally covered with the insulating layer 15 so that the electrical insulation of the first spiral wiring 21A and the second spiral wiring 22A is ensured.

The spiral wirings 21A, 22A each have a spiral part 200, a first pad part 201, a second pad part 202, and two lead-out parts 203. The first pad part 201 is connected to the first vertical wiring 51, and the second pad part 202 is connected to the second vertical wiring 52. The spiral part 200 has one end at the first pad part 201 and the other end at the second pad part 202 and extends from the first pad part 201 and the second pad part 202 on the first plane. One of the lead-out part 203 extends from the first pad part 201 on the first plane and is exposed from the first side surface 10*a* parallel to the first direction Z of the element body 10. The other lead-out part 203 extends from the second pad part 202 on the first plane and is exposed from the second side surface 10*b* parallel to the first direction Z of the element body 10. The first side surface 10*a* and the second side surface 10*b* are located on the sides opposite to each other. As a result, it is not necessary to construct a dedicated line etc. in which countermeasures against static electricity are taken so as to enhance the inductance acquisition efficiency, and the inductor component 1A capable of suppressing a reduction in manufacturability can be provided. Additionally, the multiple spiral wirings 21A, 22A can be formed in the inductor component 1A.

In the first spiral wiring 21A, the angle formed by each of the lead-out parts 203 (extending direction) and the spiral part 200 (extending direction) is 180°, and in the second spiral wiring 22A, the angle formed by each of the lead-out parts 203 (extending direction) and the spiral part 200 (extending direction) is 180°.

Figure 7:
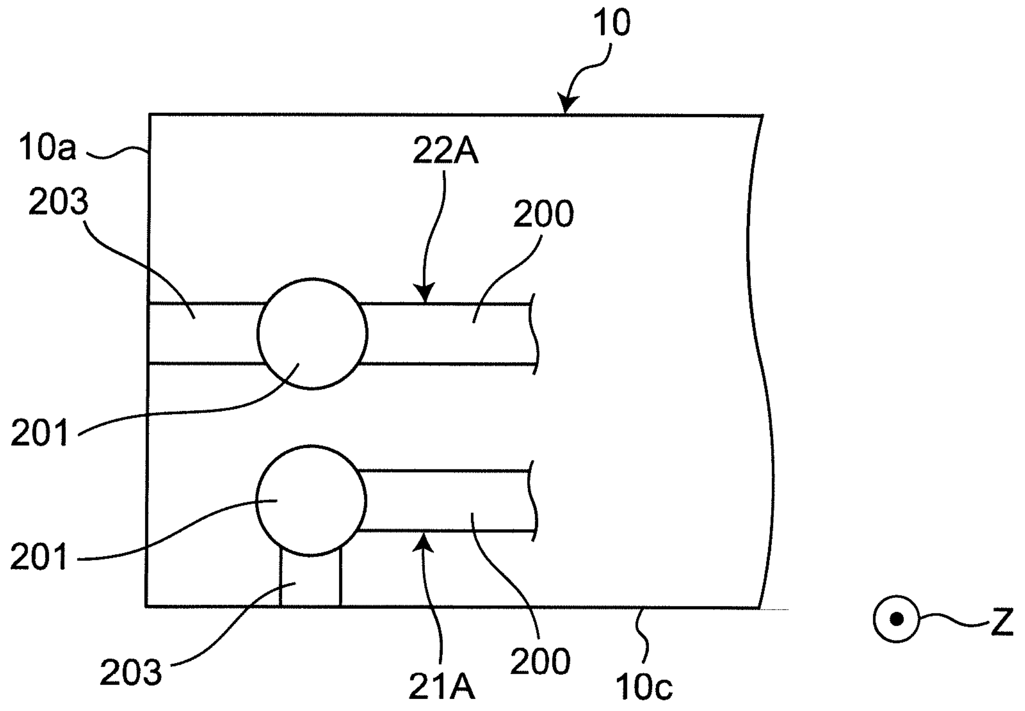
FIG. 7 is a simplification view showing another positional relationship between the spiral part and the lead-out part.

As shown in FIG. 7, the first side surface 10*a* of the element body 10 exposing the second spiral wiring 22A may be orthogonal to the third side surface 10*c* of the element body 10 exposing the first spiral wiring 21A. Specifically, in the first spiral wiring 21A, the angle formed by the lead-out part 203 (extending direction) and the spiral part 200 (extending direction) is 90°, and in the second spiral wiring 22A, the angle formed by the lead-out part 203 (extending direction) and the spiral part 200 (extending direction) is 180°. As a result, a potential difference is less likely to occur between the inductor components formed in a matrix shape in the mother substrate.

The present disclosure is not limited to the embodiments described above and may be changed in design without departing from the spirit of the present disclosure. For example, respective feature points of the first and second embodiments may variously be combined.

For example, in the first and second embodiments, the lead-out part extends from the pad part in a direction without turning back toward the spiral part; however, the present disclosure is not limited to this configuration, and the lead-out part may extend in a direction causing the lead-out part to turn back toward the spiral part. In other words, the angles formed by the direction of extension of the lead-out part from the pad part and the direction of extension of the spiral part from the pad part may include an angle less than 90° as the angle that is not larger.

What is claimed is:

1. An inductor component comprising:

an element body including a first magnetic layer and a second magnetic layer that contain a metal magnetic powder and that are laminated along a first direction;

a spiral wiring disposed between the first magnetic layer and the second magnetic layer;

a vertical wiring connected to the spiral wiring and extending in the first direction to penetrate the element body; and an external terminal connected to the vertical wiring, the external terminal including an exposed surface that is exposed on a first principal surface of the element body orthogonal to the first direction, wherein the spiral wiring is disposed on a first plane orthogonal to the first direction and includes a pad part to which the vertical wiring is connected, a spiral part extending from the pad part on the first plane, and a lead-out part that extends on the first plane and is exposed from a side surface of the element body parallel to the first direction, the pad part and the lead-out part are disposed on opposite ends of the spiral wiring, the pad part is disposed at an innermost end of the spiral part, when viewed in plan view, the vertical wiring is entirely surrounded by a periphery of the pad part, the vertical wiring extends, in the first direction, from the spiral wiring to the external terminal, on the first principal surface of the element body, the external terminal is embedded in, and entirely surrounded by, an insulating coating film, the exposed surface of the external terminal is aligned in a plane with an exposed surface of the insulating coating film, the exposed surface of the external terminal is separated from all side surfaces of the element body parallel to the first direction by the insulating coating film, and the vertical wiring and the pad part have an elliptical shape when viewed in plan view, the elliptical shape having a minor axis in the first direction and a major axis in a second direction orthogonal to the first direction, the major axis and minor axis being different lengths.

2. The inductor component according to claim 1, wherein the lead-out part extends in a direction without turning back toward the spiral part.

3. The inductor component according to claim 2, wherein the lead-out part extends in a direction opposite to a center side of the spiral part.

4. The inductor component according to claim 1, wherein the width of the pad part is larger than the width of the spiral part and larger than the width of the lead-out part.

5. The inductor component according to claim 1, further comprising:

an insulating layer coating a surface of the spiral wiring and containing no magnetic substance, wherein the vertical wiring includes a columnar wiring penetrating the first magnetic layer or the second magnetic layer of the element body and a via wiring penetrating the insulating layer.

6. The inductor component according to claim 1, wherein the lead-out part includes an oxide film exposed from the side surface of the element body.

7. The inductor component according to claim 6, wherein the oxide film is a metal oxide film.

8. The inductor component according to claim 1, wherein the width of the lead-out part is equal to or less than the width of the spiral part and equal to or greater than 50 μm.

9. The inductor component according to claim 1, wherein the thickness of the lead-out part is equal to the thickness of the spiral part.

10. The inductor component according to claim 1, wherein an area of an exposed surface of the lead-out part exposed from the side surface of the element body is larger than a cross-sectional area of a portion of the lead-out part located inside the element body.

11. The inductor component according to claim 1, further comprising:

a second spiral wiring disposed between the first magnetic layer and the second magnetic layer; and another vertical wiring connected to the second spiral wiring and extending in the first direction to penetrate the element body, wherein the second spiral wiring is disposed on the first plane and includes another pad part to which the other vertical wiring is connected, another spiral part extending from the other pad part on the first plane, and another lead-out part extending from the other pad part on the first plane and exposed from a side surface of the element body parallel to the first direction.

12. The inductor component according to claim 11, wherein the side surface exposing the second spiral wiring is orthogonal to the side surface exposing the spiral wiring.

13. The inductor component according to claim 2, wherein the width of the pad part is larger than the width of the spiral part and larger than the width of the lead-out part.

14. The inductor component according to claim 2, further comprising:

an insulating layer coating a surface of the spiral wiring and containing no magnetic substance, wherein the vertical wiring includes a columnar wiring penetrating the first magnetic layer or the second magnetic layer of the element body and a via wiring penetrating the insulating layer.

15. The inductor component according to claim 2, wherein the lead-out part includes an oxide film exposed from the side surface of the element body.

16. The inductor component according to claim 2, wherein the width of the lead-out part is equal to or less than the width of the spiral part and equal to or greater than 50 μm.

17. The inductor component according to claim 2, wherein the thickness of the lead-out part is equal to the thickness of the spiral part.

18. The inductor component according to claim 2, wherein an area of an exposed surface of the lead-out part exposed from the side surface of the element body is larger than a cross-sectional area of a portion of the lead-out part located inside the element body.

19. An inductor component comprising:

an element body including a first magnetic layer and a second magnetic layer that contain a metal magnetic powder and that are laminated along a first direction;

a spiral wiring disposed between the first magnetic layer and the second magnetic layer;

first and second vertical wirings connected to the spiral wiring and extending in the first direction to penetrate the element body; and first and second external terminals respectively connected to the first and second vertical wirings, the first and second external terminals each including an exposed surface that is exposed on a first principal surface of the element body orthogonal to the first direction, wherein the spiral wiring is disposed on a first plane orthogonal to the first direction and includes a first pad part to which the first vertical wiring is connected, a second pad part to which the second vertical wiring is connected, a spiral part extending from the first pad part to the second pad part on the first plane, and a lead-out part extending from the second pad part on the first plane and exposed from a side surface of the element body parallel to the first direction, when viewed in plan view, the first vertical wiring is entirely surrounded by a periphery of the first pad part, the first vertical wiring extends, in the first direction, from the spiral wiring to the first external terminal, on the first principal surface of the element body, the first and second external terminals are embedded in, and entirely surrounded by, an insulating coating film, the exposed surfaces of the first and second external terminals are aligned in a plane with an exposed surface of the insulating coating film, the exposed surfaces of the first and second external terminals are separated from all side surfaces of the element body parallel to the first direction by the insulating coating film, and the first and second vertical wirings and the first and second pad parts have an elliptical shape when viewed in plan view, the elliptical shape having a minor axis in the first direction and a major axis in a second direction orthogonal to the first direction, the major axis and minor axis being different lengths.

20. An inductor component comprising:

an element body including a first magnetic layer and a second magnetic layer that contain a metal magnetic powder and that are laminated along a first direction;

a spiral wiring disposed between the first magnetic layer and the second magnetic layer;

a vertical wiring connected to the spiral wiring and extending in the first direction to penetrate the element body; and an external terminal connected to the vertical wiring, the external terminal including an exposed surface that is exposed on a first principal surface of the element body orthogonal to the first direction, wherein the spiral wiring is disposed on a first plane orthogonal to the first direction and includes a pad part to which the vertical wiring is connected, a spiral part extending from the pad part on the first plane, and a lead-out part that extends on the first plane and is exposed from a side surface of the element body parallel to the first direction, the pad part and the lead-out part are disposed on opposite ends of the spiral wiring, the pad part is disposed at an innermost end of the spiral part, the vertical wiring is entirely buried within the element body such that, of the lead-out part and the vertical wiring, only the lead-out part is exposed on the side surface of the element body, on the first principal surface of the element body, the external terminal is embedded in, and entirely surrounded by, an insulating coating film, the exposed surface of the external terminal is aligned in a plane with an exposed surface of the insulating coating film, the exposed surface of the external terminal is separated from all side surfaces of the element body parallel to the first direction by the insulating coating film, and the vertical wiring and the pad part have an elliptical shape when viewed in plan view, the elliptical shape having a minor axis in the first direction and a major axis in a second direction orthogonal to the first direction, the major axis and minor axis being different lengths.

21. An inductor component comprising:

an element body including a first magnetic layer and a second magnetic layer that contain a metal magnetic powder and that are laminated along a first direction;

a spiral wiring disposed between the first magnetic layer and the second magnetic layer;

first and second vertical wirings connected to the spiral wiring and extending in the first direction to penetrate the element body; and first and second external terminals respectively connected to the first and second vertical wirings, the first and second external terminals each including an exposed surface that is exposed on a first principal surface of the element body orthogonal to the first direction, wherein the spiral wiring is disposed on a first plane orthogonal to the first direction and includes a first pad part to which the first vertical wiring is connected, a second pad part to which the second vertical wiring is connected, a spiral part extending from the first pad part to the second pad part on the first plane, and a lead-out part extending from the second pad part on the first plane and exposed from a side surface of the element body parallel to the first direction, the first vertical wiring is entirely buried within the element body such that, of the lead-out part and the first vertical wiring, only the lead-out part is exposed on the side surface of the element body, on the first principal surface of the element body, the first and second external terminals are embedded in, and entirely surrounded by, an insulating coating film, the exposed surfaces of the first and second external terminals are aligned in a plane with an exposed surface of the insulating coating film, the exposed surfaces of the first and second external terminals are separated from all side surfaces of the element body parallel to the first direction by the insulating coating film, and the first and second vertical wirings and the first and second pad parts have an elliptical shape when viewed in plan view, the elliptical shape having a minor axis in the first direction and a major axis in a second direction orthogonal to the first direction, the major axis and minor axis being different lengths.

* * * * *